Jan. 17, 1956 D. C. GRESHAM 2,731,346

PHOTOGRAPHIC METHOD OF MAKING INTAGLIO PRINTING ELEMENTS

Filed Jan. 20, 1955 2 Sheets-Sheet 1

INVENTOR.
DONALD C. GRESHAM
BY John P. Chandler
his ATTORNEY.

Jan. 17, 1956 D. C. GRESHAM 2,731,346

PHOTOGRAPHIC METHOD OF MAKING INTAGLIO PRINTING ELEMENTS

Filed Jan. 20, 1955 2 Sheets-Sheet 2

INVENTOR.
DONALD C. GRESHAM
BY John P. Chandler
HIS ATTORNEY.

United States Patent Office 2,731,346

Patented Jan. 17, 1956

2,731,346

PHOTOGRAPHIC METHOD OF MAKING INTAGLIO PRINTING ELEMENTS

Donald C. Gresham, New York, N. Y., assignor to McCorquodale-Gresham, Inc., Long Island City, N. Y., a corporation of New York Application January 20, 1955, Serial No. 482,976

6 Claims. (Cl. 95—5)

This invention relates to photogravure printing and relates more particularly to an improved method of making intaglio printing elements. An important object of the present invention is to provide a new method of making screen records for use in the preparation of plates and cylinders for gravure printing. Another object of the invention is to provide a novel method of making positive screen rcords directly from continuous tone positives. The present application constitutes a continuation-in-part of my earlier applications which matured into Patents Nos. 2,704,252 of March 15, 1955, and 2,711,372 of June 21, 1955.

A further object of the invention is to provide an improved process for making a resist for the etching of said printing plates. The term "printing plate" as used herein is deemed to include a flat printing plate or a cylindrical printing roller.

The older method of forming printing plates for photogravure printing and the cylinder employed in the related process of rotogravure printing was to form a printing surface comprising a large number of ink-receiving cells or cavities defined by intersecting rows of raised areas whose upper surfaces were co-planar and which formed a support for the doctor blade which passed over the plate after the same had been inked, in order to remove the surplus ink. These ink-receiving cells were of substantially uniform area and of varying depth. This varying depth of the cells was utilized to reproduce the range of tones from the highlights to the darkest shadow areas, the deeper cells receiving the greatest amount of ink and accordingly printing the darkest tones in the picture.

To make a plate of this character wherein the cavities are of substantially uniform area but of varying depth a resist is formed by successively exposing two transparencies on a carbon tissue sheet, one of which is a conventional gravure screen having opaque areas to overlay portions of the resist in which the cells are to be formed and transparent areas or lines to expose the remaining portions which form the land areas. The other is an unscreened positive of the subject which produces varying exposures of the areas in which the cells are to be formed.

A more recent deveopment provided a process wherein the printing plate had cavities which varied in area as well as in depth. This process consisted generally in preparing continuous tone negatives by photographing the original subject through color filters. These negatives were color corrected by hand work or by masking methods. From each of the negative two positives were made by re-photographing them in the camera, once without a half-tone screen to yield a continuous tone positive and once with a cross-line half-tone screen placed close to the sensitive plate to yield a screen positive of special characteristics. The continuous tone positive was further retouched wherever necessary but the screen positive was usually used without correction or other modification. The two positives were successively printed in register on a sheet of carbon tissue which was transferred to a copper plate or cylinder which was then processed to yield a resist to control etching of the printing surface with ferric chloride.

This process, known as the Dultgen process, had certain advantages and certain obvious disadvantages. The process did produce cells varying both in area and in depth in accordance with the tone value of the subject, which resulted in greater reliability in etching and provided a printing surface with longer wearing qualities and which lent itself better than the conventional gravure surface to modification by hand work or re-etching.

The chief disadvantage in this process lay in the lack of uniform density over the area of each dot. Because the screen positive produced by this process replaced the conventional gravure screen and because it was necessary to have on the printing surface a continuous co-planar bearing surface of unetched copper for the doctor blade on the printing press, even in the darkest shadows of the subject, the Dultgen screen positive must have dots in the darkest shadow areas of the subject which do not quite join up. In order to make a screen positive with the required very short range of dot size from a small highlight dot to a just-unjoined checkerboard formation, it was necessary to use a very short screen distance and to employ a cross-line half-tone screen in which the opaque lines are wider than the transparent openings. This caused the dots to be graded in density from their centers to the edges. This gradation of the dot was claimed for some time to yield etched cells on the final printing surface which gave superior printing qualities.

It has now been found that this is a fallacy and that, in fact, better printed results are obtained from printing surfaces prepared from screen positives having 'hard" dots, i. e., dots with substantially uniform, very high density from their centers to their edges. Moreover, there is considerably more latitude in making the prints on the carbon tissue from a "hard-dot" positive than from a "graded-dot" positive. It is difficult, however, to make a short range screen positive with hard dots from a continuous tone negative having a density range which must also be suitable for making the continuous tone positive.

Another disadvantage of this system lay in the fact that any retouching which may be found necessary on the continuous tone positive does not appear on the screen positive. Therefore, as far as possible, all correction must be carried out on the negative since corrections on the screen positive are not generally satisfactory. Many of these corrections are much easier to carry out on the continuous tone positive so that the retoucher has to choose between difficult work on the negative or easier work on the continuous tone positive which will not appear on the screen positive. If he chooses the latter he must exaggerate his corrections to compensate for the lack of correction on the screen positive. Moreover, it is found in practice that there is a flattening of tones in the shadow areas of the screen positive which necessitates compensation by retouching the continuous tone negative and positive to increase the separation of its shadow tones.

In the Dultgen method of making the half-tone positive there is a limitation of the total permissible area of dot in the deepest shadow tones. The total effective dot area, allowing for printing through the soft edges at the carbon printing stage, cannot exceed 50%, for if it did the checkerboard pattern in the shadow area would join at the corners and lose the continuous bearing surface on the final etched surface. It has been found that a shadow dot area of about 55% is desirable for etching cylinders for printing on newsprint while an appreciably greater area may be desirable for etching cylinders for printing on other materials. It is possible to obtain this greater area only by altering the checkerboard arrangement of dots to a pattern of substantially square dots in which the side of each dot is parallel to the side of each adjoining dot as is the case in a conventional gravure screen.

From the foregoing it will be readily apparent that a marked improvement over the Dultgen process would be achieved if the screen positive as commonly used in that process could be replaced by a hard dot screen positive with a shadow formation of square dots whose sides were all parallel and which were made from the finally retouched continuous tone positive instead of from the continuous tone negative. Other practical advantages would also accrue. For instance, in the Dultgen process, it is necessary to restrict the density range of the continuous tone negatives in order to obtain satisfactory short-range screen positives. Actually a somewhat longer range negative helps the retoucher and yields a better continuous tone positive. In practice it often happens that overlay masks on the negatives fail to register exactly and in the Dultgen system this causes fringes on both the screen and on the continuous tone positive which appear on the final print. If the screen positive could be made from the continuous tone positive it would be a simple matter to retouch out the unwanted fringes on this continuous tone positive and thus to eliminate them on the screen positive also. Often the final print must necessarily be a combination of several different pieces of copy so that several sets of negatives must be "photo-composed" on a single set of positives. In the Dultgen system this work must be done twice, once for the continuous tone positives and once for the screen positives, with all the attendant risks of mis-register. If the screen positives could be made from the continuous tone positives it would be necessary to do the composing only once.

I have found that the use of the reversal process described in my said Patents 2,704,252 and 2,711,372 makes it possible to produce greatly improved screen positives directly from continuous tone positives by following the teachings of the present invention. The continuous tone and screen positives are then printed successively in register on carbon tissue or other material suitable for preparing a permeable resist varying in thickness in accordance with the tones of the continuous tone positives, to produce etching resists on intaglio plates.

Figure 1:
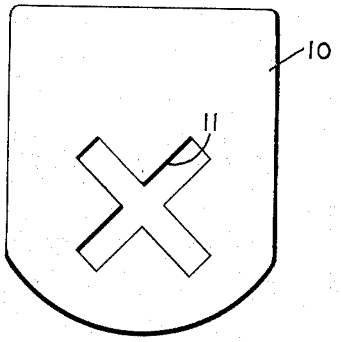
Fig. 1 is a plan view of a lens stop used in the process of the present invention.

The stop shown in Fig. 1 consists of a thin plate 10 of opaque material having a symmetrical aperture 11 of generally cruciform shape. The second stop 12 shown in Fig. 2 has a cross-shaped opening 13 with its center blocked out as shown at 14.

The procedure is to set up the finished continuous tone positive in the transparency holder of a process camera. A cross-line half-tone screen with a ratio of 1:1 between the opaque lines ad transparent openings such as is used in regular letterpress half-tone engraving, or a screen with a ratio of more than 1:1 between the opaque lines and transparent openings such as is regularly used in the Dultgen process, is located in the normal screen holder of the camera just in front of the sensitive plate holder. The camera is adjusted and focused to give an image of optimum definition exactly the same size as the continuous tone positive. A symmetrical cross stop 10 of suitable dimensions is placed in the lens so that its arms are parallel to the screen rulings. A symmetrical transparent cross with arms 6 mm. x 30 mm. at 90° to each other for a lens of 45 cm. focal length gives excellent results.

The separation of the screen from the surface of the sensitive plate or film is adjusted to give a sharply defined cross-line image on the plate. This distance has to be varied in accordance with the pitch of the screen ruling, the ratio of width of screen line to transparent opening and the dimensions of the stop which can be varied over a wide range if compensated by screen distance adjustment. A typical distance for a screen with 133 lines to the inch and 1:1 line to space ratio would be 6 mm. It is preferable but not essential to introduce a filter into the lens to restrict the wave band of the exposing light. This minimizes distortion of the dots in the final image due to diffraction patterns. For instance, if an orthochromatic sensitive material is used, a tri-color green filter is suitable. A high contrast photographic plate or film, such as is used in letterpress engraving for making screen negatives, is placed in the camera and is given two exposures, one to the continuous tone positive and another "flash" exposure with the positive removed. This flash exposure is preferred but optional.

The plate or film is now processed by developing to silver the latent image, thereby producing a negative image in color, producing a colored image in situ therewith and bleaching the same silver image, secondarily exposing said plate or film to light incident on the same side thereof as the first exposure, said light being of a color to which the photographic emulsion is sensitive but which is absorbed by the said colored image, redeveloping the said plate or film in a developer which will not redevelop any rehalogenized silver negative which may be present, redeveloping the said plate or film, fixing the plate or film to remove all residual silver halide, and removing the colored image.

The developing conditions for the first (color) development are chosen so that the gamma value of the screen negative is not less than 2.0. This gamma value is a figure derived by developing a step wedge on the material to be used in the color developer to be used, fixing out the undeveloped silver halide in a fixing bath which does not appreciably affect the dye image, bleaching the silver image in the bleaching bath to be used, measuring the densities of the wedge steps through a filter of complementary color to the dye image, plotting these densities against the logarithms of the exposure which produced them and deriving the gradient value from the curve in the usual way. The developing conditions for the second (silver positive) development are chosen so that the overall gamma value of the positive image, which is the product of the negative and positive gamma values, is not less than 4:0. For optimum results this product should be not less 8:0.

Figure 3:
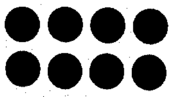
Fig. 3 shows a dot formation wherein the dots are circular in shape.
Figure 4:
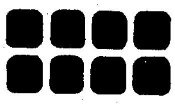
Fig. 4 shows a second dot formation consisting of square dots with rounded corners.

The screen positives obtained by these methods are capable of wide modification by slight adjustments in the exposure conditions. Thus the dot shape can be varied from circular as in Fig. 3 through square with rounded corners as in Fig. 4, square as in Fig. 5, to "pin-cushion" shape as in Fig. 6 by simply varying the distance between the screen and the sensitive plate or film. The width of the clear lines in the shadow areas can be modified over a wide range by adjustments to the flash exposure. These adjustments are extremely useful for making screen positives with dots of optimum shape and size for preparing cylinders to print on different materials.

EXAMPLES

In all the following examples a process camera was used for producing the screen positives from continuous tone positives having a density range of 0 to 1.5. The camera was equipped with a lens of 45 cm. focal length and was adjusted to give an image of optimum definition and exactly the same size as the original positive. The positives were uniformly illuminated from the back by a "cold-cathode" lighting unit.

*Example I*

1. The stop 10 shown in Fig. 1 consisting of a thin metal plate with a symmetrical cross-shaped aperture 11 having two arms 6 mm. x 30 mm. at 90° to each other was placed in the lens together with a "Wratten" #56 (green) filter. One arm of the cross was arranged to be at 60° to vertical. A circular Dultgen cross-line screen with a ratio of line to space of 8:5 and 150 rulings per inch was placed in the screen holder and rotated to bring the rulings parallel to the arms of the aperture in the stop. The separation between the plane of the screen rulings and the plane to be occupied by the sensitive plate was adjusted to 5.25 mm.

2. A "Kodalith" plate was placed in the plate holder of the camera and the yellow-printing continuous tone positive of a four color set was placed in the transparency holder.

3. An exposure of 2½ minutes was given.

4. The positive was removed and an additional exposure of 20 seconds was given without it.

5. The exposed plate was developed for 3 minutes at 68° F. in a blue dye-forming developer constituted of equal parts of the following solutions A and B:

A

| | | |
|---|---|---|
| N.N-diethyl-p-phenylene diamine, sulphur dioxide reaction product | g | 4.5 |
| Sodium sulphite (anhydrous) | g | 18.5 |
| Potassium bromide | g | 4 |
| Water to make | cc | 2250 |

B

| | | |
|---|---|---|
| Acetone | cc | 200 |
| Thymol | g | 20 |
| Sodium hydroxide | g | 14 |
| Sodium carbonate (anhydrous) | g | 132 |
| Water to make | cc | 2250 |

6. The plate was washed in running water for 5 minutes.

7. The plate was treated for 3 minutes at 68° F. in a bath of the following composition:

| | | |
|---|---|---|
| Potassium ferricyanide | g | 50 |
| Potassium ferrocyanide | g | 12.5 |
| Potassium bromide | g | 50 |
| Sodium carbonate | g | 20 |
| Water to make | liter | 1 |

8. The plate was washed for 5 minutes in running water.

9. The plate was laid, emulsion side up, in a black-bottomed tray containing about 1 inch of water. A bank of three 40-watt "Gold" fluorescent tubes was positioned 40" above the tray and these were switched on for 45 seconds.

10. The plate was developed for 2¼ minutes in "Kodalith" developer at 68° F.

11. The plate was bathed for 1 minute in a mixture of 2% concentrated hydrochloric acid in water. (This had the double purpose of stopping development and destroying the blue dye image of the first development.)

12. The plate was fixed in an acid hardening fixing bath.

13. The plate was washed.

14. The plate was treated with weak Farmer's Reducer to cut away the weak dot which appeared in the areas corresponding to the clear background areas of the continuous tone positive.

15. The plate was washed and dried.

This gave a screen positive having no dots in areas corresponding to areas of the continuous tone positive having a density less than 0.2 but having an exceptionally hard dot of about 5% area in areas corresponding to areas of the continuous tone positive having a density of 0.25. In the shadow areas corresponding to densities of 1.5 on the continuous tone positive there was a formation of square dots with rounded corners, as in Fig. 4, having an area of about 55%.

Three more screen positives were made in exactly the same way from the red, blue and black-printing continuous tone positives except that the stop in the lens was changed so that one arm of the cross was respectively at 75°, 105° and 45° to the vertical and in each case the screen was rotated to bring its lines parallel to the arms of the stop.

Each of the four screen positives was printed on a piece of carbon tissue and each print was overprinted in register with the continuous tone positive from which the screen positive was made. The carbon tissue prints were transferred to copper plates and processed in known manner to form etching resists. The plates were etched in the usual way with multiple baths of different strengths of ferric chloride. The etched plates were printed in the appropriate colored inks and yielded a full color picture of exceptional definition, smoothness and brilliance.

*Example II*

Figure 2:
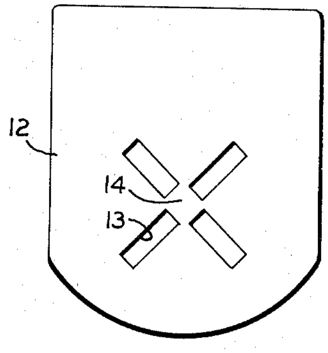
Fig. 2 shows a lens stop with an opening of alternative shape.

1. A stop consisting of a thin metal plate with a symmetrical cross-shaped aperture having two arms 4 mm. x 30 mm. at 90° to each other and with its center blocked out as shown in Fig. 2 was placed in the lens together with a "Wratten" #56 (green) filter. One arm of the cross was at 60° to the vertical. A circular engraver's cross-line screen with a ratio of line to space of 1:1 and 120 rulings per inch was placed in the screen holder and rotated to bring the rulings parallel to the arms of the aperture in the stop. The separation between the plane of the screen rulings and the plane to be occupied by the sensitive plate was adjusted to 6 mm.

Step 2 was exactly as in Example I.

3. An exposure of 5 minutes was given.

Steps 4–15 were exactly as in Example I.

Figure 5:
Fig. 5 shows a square dot formation.
Figure 6:
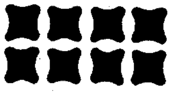
Fig. 6 shows a formation of dots with indented or concavely curved sides to give the dot a generally "pin-cushion" shape.

This gave a screen positive similar to that obtained in Example I at the highlight end of the tone scale but in the shadow areas corresponding to densities of 1.5 on the continuous tone positive there was a formation of square dots, as in Fig. 5, having an area of 75%.

As in Example I three more screen positives were made for the other colors using the different angles for the screen and apertures. Such positives can be used to prepare etched cylinders in the same way as the plates of Example I. The etched cylinders can be used to print in inks of the appropriate colors on a non-absorbent surface. The result would be then of exceptional quality because the large area of the cells in the shadow areas of the engravings due to the special screen positives used would allow sufficient ink to be carried by a relatively shallow etching. This would minimize ink creep which is normally particularly troublesome in this type of printing.

*Example III*

1. Step 1 was exactly as in Example I except that a circular engraver's cross-line screen, with a ratio of line to space of 1:1 and 133 rulings per inch, was used. In this case a screen separation of 6 mm. was used.

2. A "Kodak" B4 plate (a product of Kodak Ltd., England, having a high-contrast, blue-sensitive emulsion) was placed in the plate holder of the camera and the yellow-printing continuous tone positive of a four-color set was placed in the transparency holder.

3. An exposure of 40 seconds was given.

4. The positive was removed and an additional exposure of 5 seconds was given without it.

5. The exposed plate was developed for 3 minutes at

68° F. in a yellow dye-forming developer constituted of equal parts of the following solutions A and B:

A

| | | |
|---|---|---|
| N.N-diethyl-p-phenylene diamine, sulphur dioxide reaction product | g | 4.5 |
| Sodium sulphite (anhydrous) | g | 18.5 |
| Potassium bromide | g | 4 |
| Water to make | cc | 2250 |

B

| | | |
|---|---|---|
| Acetone | cc | 200 |
| 2:5-dichloracetoacetanilide | g | 20 |
| Sodium hydroxide | g | 14 |
| Sodium carbonate (anhydrous) | g | 132 |
| Water to make | cc | 2250 |

Steps 6, 7 and 8 were exactly as in Example I.

9. The plate was drained and replaced in the plate holder of the camera with the screen removed. The stop was replaced by a "Wratten" #47B (blue) filter and the full plate was given an exposure of 60 seconds at the full aperture of the lens (46 mm.) to the uniform cold cathode transparency illuminator.

10. The plate was developed for 3 minutes at 68° F. in a developer made up of equal parts of the following solutions A, B and C:

A

| | | |
|---|---|---|
| Hydroquinone | g | 38 |
| Potassium metabisulphite | g | 38 |
| Potassium bromide | g | 19 |
| Water to make | litres | 2 |

B

| | | |
|---|---|---|
| Potassium hydroxide | g | 75 |
| Water to make | litres | 2 |

C

| | | |
|---|---|---|
| 1% solution of benzotriazol | cc | 45 |
| Water to make | litres | 2 |

11. The plate was bathed for 1 minute in a mixture of 5% glacial acetic acid in water. (This stopped development and destroyed the yellow image of the first development.)

Steps 12–15 were exactly as in Example I.

This gave a positive which had exactly the same characteristics as that made in Example I. Three more screen positives were made to complete the set as in Example I and proofs from plates etched from this set matched proofs from the set in Example I closely.

The various factors involved in this process are variable over a wide range provided they are compensated by changes in other factors. For instance, stop apertures of different dimensions from those given in the examples can be used with suitable adjustments to the screen separation and/or the ratio between the exposure given to the continuous tone positive and the flash exposure. There are many possible variations in shape and dimension of stops which come within the scope of this invention. Where lenses of different focal length are used the dimensions of the stop are simply scaled up or down in proportion to the focal lengths. To some extent variations in the second exposure of the plate before second development can compensate for variations in the first exposure—the greater the first exposure the greater the second exposure should be.

Figure 7:
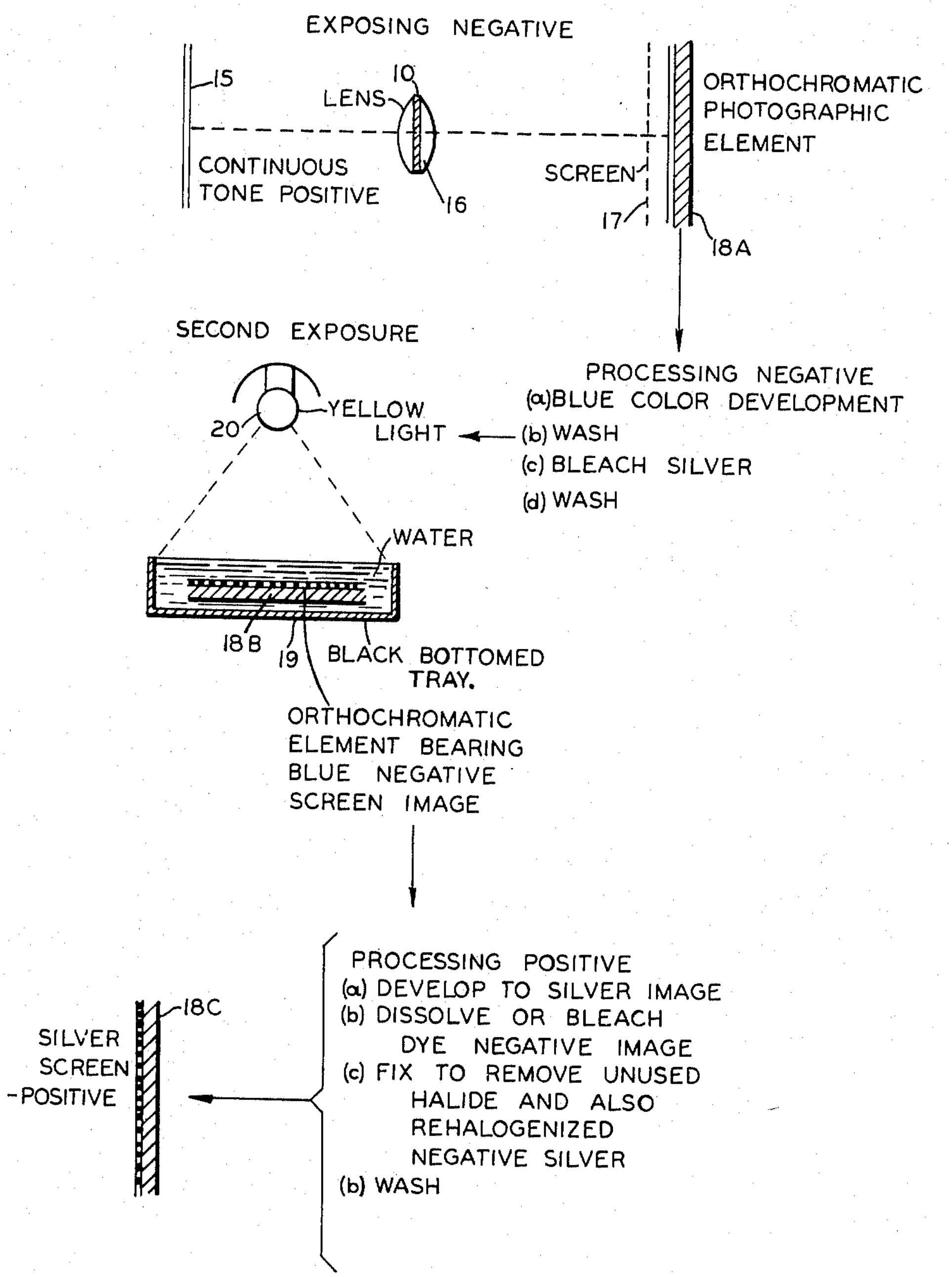
Fig. 7 is a flow diagram illustrating the material at the various stages of the process of the present invention.

The flow sheet of this method is illustrated in Fig. 7 wherein a continuous tone positive 15 is copied in the camera (illustrated as lens 16 having a stop 10 of the type shown in Fig. 1 with an opening 11 of cruciform shape) onto a photographic element 18A via a screen 17. The element 18A is color developed, washed, treated to bleach the silver image, washed and (now identified as 18B) placed emulsion side up in a black-bottomed tray 19 containing about one inch of water. The second exposure is made with a yellow light source 20. The element 18B is then processed to develop a silver image, treated to remove the dye image, and to remove residual silver halide and rehalogenized negative silver. This gives the final product 18C which carries a silver screen positive image having dot formation in the shadow areas of the type illustrated generally in Figs. 3 to 6, the precise shape depending on the dimensions of the opening 11 in the stop 10 and the distance between the screen 17 and the element 18A.

What I claim is:

1. The improved process for making printing plates which consists of making a continuous tone positive from an original subject and from this positive making a screen positive by exposing a plate behind a half-tone screen to light from a continuous tone positive of the original subject in a process wherein the lens opening is of substantially cruciform shape in which the lines of the cross are disposed substantially parallel with the lines of the screen, giving the plate a second flash exposure with the continuous tone positive removed, then developing to silver the latent image, with a developer that produces a dye in situ with the silver image, said dye image having a gamma value of at least 2.0, and bleaching the silver image, secondarily exposing said plate to light incident on the same side as the first exposure, said light being of a color to which the photographic emulsion is sensitive but which is absorbed by the said colored image, redeveloping said plate to a gamma of at least 2.0 in a developer which will not redevelop any rehalogenized silver negative image which may be present, removing the colored image and then fixing the plate to remove all residual silver halide, exposing a sheet of sensitized material suitable for preparing a permeable resist varying in thickness in accordance with the tones of a continuous tone positive, once behind said screen positive and once behind the continuous tone positive from which said screen positive was made, the successive prints being in register, processing the sensitized material to form an etching resist whose thickness varies in accordance with the tones of the continuous tone positive, said etching resist being superimposed on a printing plate material and finally etching the printing plate material to varying depths in accordance with varying thicknesses of the permeable resist.

2. The improved process for making printing plates which consists of making continuous tone positives from an original subject and from these positives making screen positives by exposing the plates behind a half-tone screen to light from the continuous tone positives in a process camera wherein the lens opening is of substantially cruciform shape in which the lines of the cross are disposed substantially parallel with the lines of the screen, then developing to silver the latent image on each plate with a developer that produces a dye image in situ with the silver image, said dye image having a gamma value of at least 2.0, and bleaching the silver image, secondarily exposing said plate to light incident on the same side as the first exposure, said light being of a color to which the photographic emulsion is sensitive but which is absorbed by the said colored image, redeveloping said plate to a gamma of at least 2.0 in a developer which will not redevelop any rehalogenized silver negative image which may be present, fixing said plate to remove all residual silver halide, then removing the dye image, exposing a sheet of sensitized material suitable for preparing a permeable resist varying in thickness in accordance with the tones of a continuous tone positive, once behind each screen positive and once behind each continuous tone positive from which said screen positive was made, the successive prints being in register, processing each piece of sensitized material to form an etching resist whose thickness varies in accordance with the tones of the continuous tone positive, and superimposing said etching resist on a printing plate material.

3. The improved process for making a half-tone photographic positive for use in the production of intaglio printing plates which consists in exposing a plate behind a half-tone screen to light from a continuous tone positive of the original subject in a process camera in which the lens opening is of substantially cruciform shape in which the lines of the cross are disposed substantially parallel with the lines of the screen, then developing to silver the latent image with a developer which produces a dye image in situ with the silver image, said dye image having a gamma value of at least 2.0 and bleaching the silver image, secondarily exposing said plate to light incident on the same side as the first exposure, said light being of a color to which the photographic emulsion is sensitive but which is absorbed by the said colored image, redeveloping said plate to a gamma of at least 2.0 in a developer which will not redevelop any rehalogenized silver negative image which may be present, fixing the plate to remove all residual silver halide, and then removing the colored image.

4. The improved process for making a half-tone photographic positive for use in the production of intaglio printing plates which consists in exposing a plate behind a half-tone screen to light from a continuous tone positive of the original subject in a process camera, in which the lens opening is of substantially cruciform shape, in which the lines of the cross are disposed substantially parallel with the lines of the screen, giving the plate a second flash exposure with the continuous tone positive removed, then developing the latent image with a developer which produces a dye image, thus producing an image in silver with dye in situ therewith, said dye image having a gamma value of at least 2.0 and bleaching the silver image, secondarily exposing said plate to light incident on the same side as the first exposure, said light being of a color to which the photographic emulsion is sensitive but which is absorbed by the said colored image, redeveloping said plate to a gamma of at least 2.0 in a developer which will not redevelop any rehalogenized silver negative image which may be present, fixing the plate to remove all residual silver halide, and then removing the colored image.

5. The improved process for making a half-tone photographic positive for use in the production of intaglio printing plates which consists of exposing a plate behind a half-tone screen to light from a continuous tone positive of the original subject in a process camera in which the lens opening is of substantially cruciform shape in which the lines of the cross are disposed substantially parallel with the lines of the screen, giving the plate a second flash exposure with the continuous tone positive removed, then developing to silver the latent image with a developer which produces a dye image in situ with the silver image, said dye image having a gamma value of at least 2.0 and bleaching the silver image, secondarily exposing said plate to light incident on the same side as the first exposure, said light being of a color to which the photographic emulsion is sensitive but which is absorbed by the said colored image, redeveloping said plate to a gamma value of at least 2.0 in a developer which will not redevelop any rehalogenized silver negative image which may be present, removing the colored image and then fixing the plate to remove all residual silver halide.

6. The improved process for making a half-tone photographic positive for use in the production of intaglio printing plates which consists of exposing a plate behind a half-tone screen to light from a continuous tone positive of the original subject in a process camera, in which the lens opening is of substantially cruciform shape, in which the lines of the cross are disposed substantially parallel with the lines of the screen, giving the plate a second flash exposure with the continuous tone positive removed, then developing to silver the latent image with a developer which produces a dye image, thus producing an image in silver with dye in situ therewith, said dye image having a gamma value of at least 2.0 and bleaching the silver image, secondarily exposing said plate to light incident on the same side as the first exposure, said light being of a color to which the photographic emulsion is sensitive but which is absorbed by the said colored image, redeveloping said plate to a gamma value of at least 2.0 in a developer which will not redevelop any rehalogenized silver negative image which may be present, fixing the plate to remove all residual silver halide, and then removing the colored image.

No references cited.